(12) United States Patent
Jiang et al.

(10) Patent No.: US 10,678,347 B2
(45) Date of Patent: Jun. 9, 2020

(54) MOUSE

(71) Applicant: Xindong Jiang, Guilin, Guangxi (CN)

(72) Inventors: Xindong Jiang, Guangxi (CN); Fang Xu, Guangxi (CN)

(73) Assignee: Xindong Jiang, Guilin, Guangxi (CN)

( * ) Notice: Subject to any disclaimer, the term of this patent is extended or adjusted under 35 U.S.C. 154(b) by 0 days.

(21) Appl. No.: 16/394,833

(22) Filed: Apr. 25, 2019

(65) Prior Publication Data

US 2019/0250725 A1    Aug. 15, 2019

Related U.S. Application Data

(63) Continuation of application No. PCT/CN2017/106885, filed on Oct. 19, 2017.

(30) Foreign Application Priority Data

Oct. 25, 2016 (CN) .......................... 2016 1 0952463

(51) Int. Cl.
*G06F 3/033* (2013.01)
*G06F 3/0354* (2013.01)
*G06F 3/03* (2006.01)

(52) U.S. Cl.
CPC ........ *G06F 3/03543* (2013.01); *G06F 3/0304* (2013.01); *G06F 3/0354* (2013.01); *G06F 2203/0333* (2013.01)

(58) Field of Classification Search
CPC .. G06F 3/0304; G06F 3/03543; G06F 3/0354; G06F 3/03; G06F 2203/0333
See application file for complete search history.

(56) References Cited

U.S. PATENT DOCUMENTS

| 10,267,620 | B2* | 4/2019 | Ikebuchi | ................. G06T 7/73 |
| 2003/0234765 | A1 | 12/2003 | Suh | |
| 2017/0314910 | A1* | 11/2017 | Ikebuchi | ................. G06T 7/73 |
| 2017/0314911 | A1* | 11/2017 | Futanni | ................. G06T 7/73 |
| 2019/0383091 | A1* | 12/2019 | Wilson | ................. B60J 3/04 |

FOREIGN PATENT DOCUMENTS

| CN | 101329605 A | 12/2008 |
| CN | 203250269 U | 10/2013 |
| CN | 106648166 A | 5/2017 |

* cited by examiner

*Primary Examiner* — Vijay Shankar
(74) *Attorney, Agent, or Firm* — Muncy, Geissler, Olds & Lowe, P.C.

(57) ABSTRACT

A mouse, including a shell which comprises a light-transmissive region disposed on a seamed edge where an outer side wall of the shell is intersected with a bottom surface of the shell, a lens configured to aggregate reflected light projected from the light-transmissive region on the working surface and transmit the reflected light to an image sensing element; an inner side of the rear part of the shell is provided with a notch configured to receive a thenar eminence part which protrudes downwards from the palm when the outer side of the shell is placed on the working surface to slide so as to sense the movement state of the cursor, such that the technical problem that a cursor movement is interrupted, frame loss occurs, keys and scroll wheels cannot be operated coherently due to switching of postures of hand is solved.

14 Claims, 13 Drawing Sheets

MOUSE

CROSS-REFERENCE TO RELATED APPLICATION

This application is the continuation application of the PCT Application No. PCT/CN2017/106885 with an international filing date of Oct. 19, 2017, and claims priority to Chinese Patent Application No. 201610952463.7, filed with China National Intellectual Property Administration on Oct. 25, 2016, and titled "mouse", the content of which is incorporated herein by reference in entirety.

TECHNICAL FIELD

The present disclosure relates to the technical field of input devices of computers, and more particularly to a mouse.

BACKGROUND

Nowadays, many people need to operate a computer for a long time, and a mouse is one of the most important input devices of the computer, strain and pain of the palm, the wrist and the arm due to long-time operation of the mouse is bringing troubles to people.

Researches show that the basic reason of strain pain and even the generation of "mouse hand" are due to long-time single stiff hand posture.

In order to relieve fatigue pain caused by the single stiff hand posture, some people have to train to alternately use the left hand and the right hand to operate the mouse, or alternately use two mouse with different sizes and shapes to operate, however, this method is very inconvenient and does not have a benefit technical solution.

The Chinese patent application with the publication No.: CN105425989 discloses an operation posture capable of switching operation postures of a wrist and a palm, meanwhile, the mouse with the index finger and the middle finger which are most easily fatigued is relaxed and relieved. According to the mouse disclosed by the present disclosure, although it is expected that the operation needs not to be stopped intermittently when the posture is switched, actually, cursor movement will be interrupted, frame loss occurs, and operations of keys and scroll wheel will be stopped.

Technical Problem

In view of this, embodiments of the present disclosure provide a mouse, which aims at solving a technical problem in the prior art that cursor movement is interrupted, frame loss occurs, and the operations of keys and scroll wheel can't be operated coherently due to switching of postures of the hand.

Technical Solution

The present disclosure provides a mouse, including:
a shell which comprises a bottom, a front end, a rear end, an inner side, and an outer side; a top surface of the front end is provided with a left key, a right key and a scroll wheel disposed between the left key and the right key;
an image sensing element which comprises a photo-sensitive surface, where an included angle between the photo-sensitive surface and the working surface is $\alpha$ when the bottom is placed on a working surface to slide so as to sense a moving state of a cursor, the included angle between the photo-sensitive surface and the working surface is $\beta$ when the outer side is placed on the working surface to slide so as to sense the movement state of the cursor, and wherein $\alpha$ is equal to $\beta$;
a light-transmissive region disposed on a seamed edge where an outer side wall of the shell is intersected with a bottom surface of the shell, or on a seamed edge where an extending surface of the outer side wall is intersected with an extending surface of the bottom surface;
a light source configured to provide a light beam projected from the light-transmissive region to the working surface; and
a lens configured to aggregate reflected light of the light beam on the working surface and transmit the reflected light to the image sensing element.

Further, a rear half part of the inner side is provided with a notch, the notch is configured to receive a thenar eminence of a palm when the outer side is placed on the working surface to slide so as to sense the moving state of the cursor, and to enable the inner side and the outer side of the rear end to be formed asymmetrically, and wherein a tail end of the rear end is deflected towards the outer side.

Furthermore, the inner side is in a straight inclined shape or is in a concave arc inclined shape or is in an inclined shape having a concave arc section and being deflected towards the outer side, which enables the tail end of the rear end of the shell to be deflected towards the outer side of the shell of the longitudinal section which passes a center line of a thickness of the scroll wheel and is perpendicular to an axial direction of the scroll wheel, starting from any position which ranges from the rear end to ⅓ location of the front end of the shell in a longitudinal length of the shell to the tail end of the rear end of the shell.

Furthermore, the notch is configured to enable the tail end of the rear end of the shell to be deflected towards the outer side of the shell of the longitudinal section which passes the center line of the thickness of the scroll wheel and is perpendicular to the axial direction of the scroll wheel.

Furthermore, the notch is in a concave arc shape which is sunken from the inner side to the outer side, and the concave arc shape is gradually narrowed from the middle to the tail end of the rear end.

Furthermore, the notch includes an inner side section which is concave arc-shaped and is sunken towards the outer side.

Furthermore, the notch comprises an inner side section which is in a straight inclined shape and is deflected towards the outer side.

Furthermore, the notch comprises an inner side section which extends from the rear end of the shell to the tail end of the rear end of the shell, is deflected towards the outer side from the inner side, and is sunken towards the outer side.

Furthermore, the bottom is provided with a depression which is sunken from the bottom surface of the shell towards the top surface of the shell, and the depression is configured to receive a thumb when the outer side is placed on the working surface to slide so as to sense the movement state of the cursor.

Furthermore, the depression is extended from a recess of the inner side having a downward opening towards the front end and is deflected towards the outer side.

Furthermore, when the outer side is placed on the working surface to slide so as to sense the movement state of the cursor, an included angle ranging from 50 degrees to 85 degrees is formed between a lowest point of the bottom contacted with the working surface or a plane where the lowest point is located and the working surface.

Furthermore, the outer side is provided with a foot pad which is configured to slide on the working surface when the outer side is placed on the working surface to slide so as to sense the movement state of the cursor.

Furthermore, a front end and a rear end of the outer side are respectively provided with a convex strip, and the convex strip is configured to slide on the working surface when the outer side is placed on the working surface to slide so as to sense the movement state of the cursor.

Advantageous Effects

The beneficial effects of the mouse provided by the present disclosure are as follows: a light-transmissive region is arranged at the seamed edge where the outer side wall of the shell intersects with the bottom surface of the shell, when the mouse is in the state that the bottom of the shell is placed on the working surface to slide, the image sensing element receives the reflected light of the light beam on the working surface from the light-transmissive region so as to sense the movement of the cursor; when the mouse is in the state that the outer side of the shell is placed in the sliding state of the working surface, the image sensing element also receives reflected light of the light beam on the working surface from the light-transmissive region so as to sense the movement of the cursor, according to the arrangement that the included angle between the photo-sensitive surface of the image sensing element and the working surface is identical in the two states, the mouse can keep stable sensitivity, such that the technical problems that the cursor movement is interrupted, frame loss occurs and the cursor movement is unstable due to switching of hand postures of the mouse are effectively solved; furthermore, according to a further arrangement, a bad adjustment action generated by the hand is avoided when the postures are switched between the two states, so that the wrist and the palm can conveniently switch operation posture between the two operation states without stopping the operations of the keys and the scroll wheel, and an occurrence of cursor drift can be avoided.

BRIEF DESCRIPTION OF THE DRAWINGS

In order to describe the embodiments of the present disclosure more clearly, a brief introduction regarding the accompanying drawings that need to be used for describing the embodiments of the present disclosure or the related art is given below; it is apparent that, the accompanying drawings described as follows are only some embodiments of the present disclosure, for the person of ordinary skill in the art, other drawings may also be obtained according to the current drawings on the premise of paying no creative labor.

FIG. 7c depicts a cross-sectional schematic diagram along a D-D direction in FIG. 7a;

DESCRIPTION OF THE EMBODIMENTS

Figure 1A:
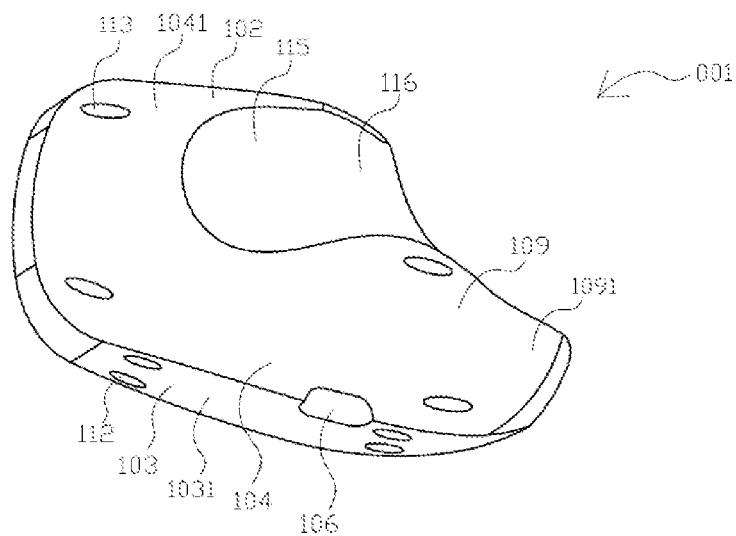
FIG. 1a depicts a stereoscopic schematic diagram of a mouse provided by embodiment one of the present disclosure.
Figure 1B:
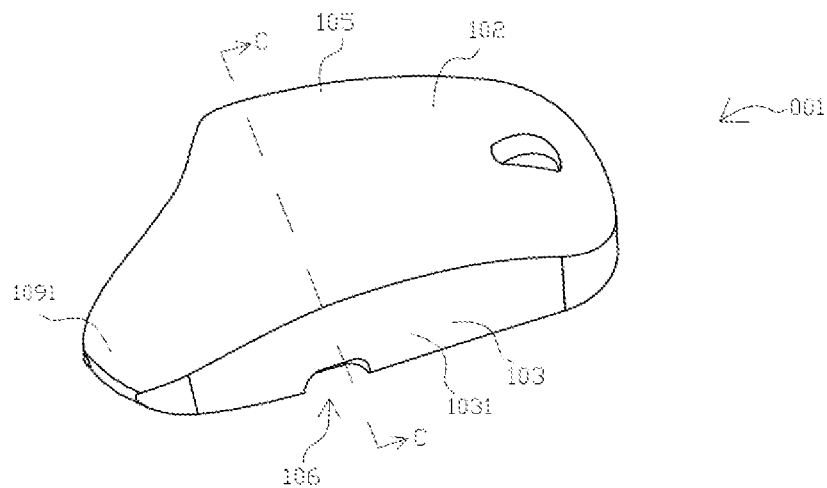
FIG. 1b depicts a stereoscopic schematic diagram of the mouse in another viewing angle provided by embodiment one of the present disclosure.

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

In order to describe the content of the present disclosure better, said "cursor frame loss" or "mouse frame loss" in the description includes a condition that an image sensed by an image sensing element is interrupted or sampling of the positioning module including the image sensing element is interrupted; said "cursor drift" means disorder of cursor pointer, but there still exists an image; and said "cursor standstill" means that the cursor pointer stays in situ and doesn't move; and said "cursor movement" means that the cursor moves from one point of the screen to another point purposefully.

Now, the mouse provided by the present disclosure is described:

Embodiment One

Please refer to FIG. 1a to 1J at the same time, a mouse 001 provided by embodiment one of the present disclosure includes a shell 102, an image sensing element 101 and a lens 107. The shell 102 includes a bottom 104, a front end 108, a rear end 109, a tail end 1091 of the rear end 109, an inner side 105, and an outer side 103. The outer side 103 is provided with an outer side wall 1031. A top surface of the front end of the shell 102 is provided with a left key and a right key, and a scroll wheel scroll wheel (not labeled) disposed between the left key and the right key. The image sensing element 101 is encapsulated in IC (Integrated Circuit) of a shell 119 which may include other functional modules, and the image sensing element 101 includes a photo-sensitive surface 1011.

Figure 1C:
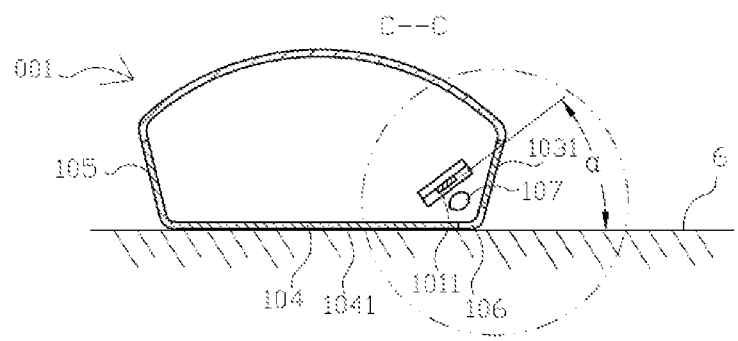
FIG. 1c depicts a cross-sectional schematic diagram of components of the mouse including a shell, a light transmission aperture, lens, and an image sensing element along a C-C direction in FIG. 1b, when the mouse is in a state that a bottom of the shell is placed on the working surface to slide.
Figure 1D:
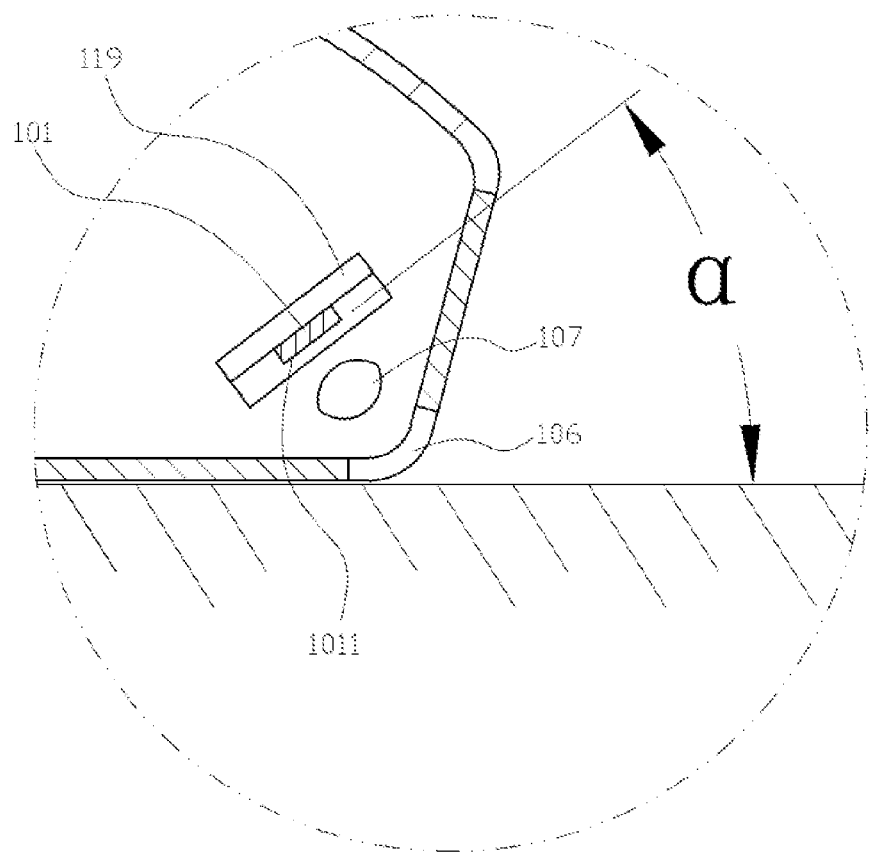
FIG. 1d depicts a schematic enlarged diagram of part E in FIG. 1c.

A light-transmissive region 106 is provided, the light-transmissive region 106 is arranged at the intersection of the outer side wall 1031 and a bottom surface 1041 of the shell, the light-transmissive region shown in the figures is a light-transmissive aperture disposed at a seamed edge where the outer side wall 1031 intersects with the bottom surface 1041 of the shell; a light source is further provided, the light source may provide a light beam, and the light beam is projected from the light-transmissive region 106; and a lens 107 is further provided, the lens 107 is configured to aggregate reflected light of the light beam on the working surface and transmit the reflected light to the image sensing element 101, reference can be made to FIG. 1c. Since the light-transmissive region 106 is arranged in such way that when the mouse is in a state that the bottom 104 of the shell is placed on the working surface 6 to slide so as to sense the movement state of the cursor, and is in a state that the inner side of the mouse is at the top and the outer side of the mouse is at the bottom and the outer side 103 of the mouse is placed on the working surface to slide so as to sense the movement state of the cursor, the light beam is irradiated on the working surface through the same light-transmissive region, and the light beam is not blocked by the seamed edge where the outer side wall 1031 intersects with the bottom surface 1041 of the shell, an image area on the working surface is neither separated nor separated, and the image sensing element may obtain images from the same continuous region on the working surface through the same light-transmissive region in the two states mentioned above and in the conversion process between the two states, reference can be made to FIG. 1c, FIG. 1d and FIG. 1e. When the mouse 001 is arranged to be in the state that the bottom of the shell is placed on the working surface to slide so as to sense the movement state of the cursor, the included angle between the photo-sensitive surface 1011 of the image sensing element 101 and the working surface 6 is α, when the mouse 001 is arranged to be in the state that the inner side of the shell is at the top and the outer side of the shell is at the bottom and the outer side of the shell is placed on the working surface to slide so as to sense the movement state of the cursor, the included angle between the photo-sensitive surface of the image sensing element and the working surface is β, where α is equal to β. Thus, the image sensing element in the two states can obtain images in the image region in the aforesaid two states, the difference in the obtained images is smaller, the mouse keeps stable sensitivity, and it is beneficial to the movement of the cursor.

According to the arrangement, the cursor can be kept form frame loss in the process of turning over the mouse towards the outer side due to the fact that the image sensing element can obtain continuous uninterrupted images, when the mouse 001 switches from the state that the bottom of the shell is placed on the working surface to slide so as to sense the cursor to the state where the outer side of the shell is placed on the working surface to slide so as to sense the movement state of the cursor. Regarding the reason for generating this effect, reference can be made to the images shown in FIG. 1f, even if the shell is turned over towards the outer side to be in a state as shown in FIG. 1f, that is, the image sensing element may still sense images of the working surface even if the mouse 001 is turned over to the seamed edge where the outer side wall 1031 is intersected with the bottom surface 1041 of the shell to be contacted with the working surface and the operation of placing the outer side of the shell on the working surface to slide haven't been completed, or the mouse is in the state in which the mouse is turned over more upwardly or more inwardly towards the inner side as compared to the state shown above. Similarly, such a condition is also true when the mouse 001 switches from the state where the outer surface of the shell is placed on the working surface to slide so as to sense the moving state of the cursor into the state where the bottom of the shell is placed on the working surface to slide so as to sense the movement state of the cursor.

When the cursor moves from one point on the screen to another target point, since the movement of sliding the mouse 001 to sense the movement of the cursor by placing the bottom of the shell on the working surface, and the movement of sliding the mouse 001 to sense the movement of the cursor by placing the outer side of the shell on the working surface are performed in the same direction, thus, the aforesaid arrangement has a more beneficial effect, such that the cursor can be kept from losing frame in the process of moving the cursor to the target point, even though the mouse 001 switches between the two operating states, and the cursor can be enabled to move smoothly to the target point without deviation, and the cursor is uninterrupted.

The aforesaid image sensing element 101 can be a CMOS (Complementary Metal Oxide Semiconductor) image sensing element or a charge coupling element.

The outer side wall 1031 of the shell is provided with a foot pad 112, and the foot pad 112 is configured to be contracted with the working surface and slide on the working surface when the outer side 103 of the shell is placed on the working surface to slide so as to sense the movement state of the cursor.

Figure 1E:
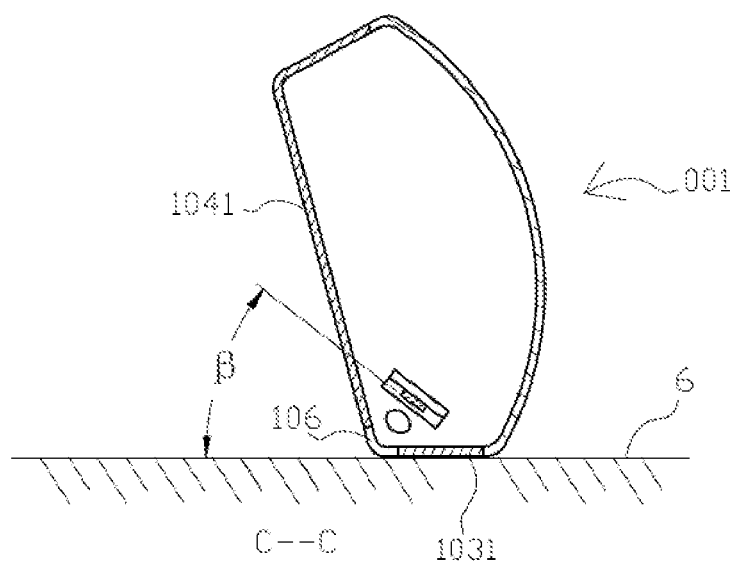
FIG. 1e depicts a cross-sectional schematic diagram of components of the mouse including a shell, a light transmission aperture, lens, and an image sensing element along the C-C direction in FIG. 1b, when the mouse is in a state that an outer side of the shell is placed on the working surface to slide.
Figure 1F:
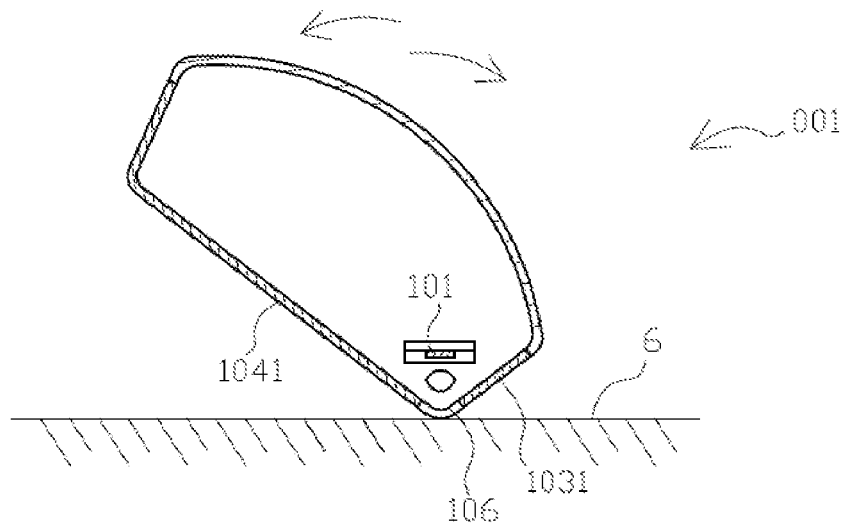
FIG. 1f depicts a cross-sectional schematic diagram of components of the mouse including a shell, a light transmission aperture, lens, and an image sensing element along the C-C direction in FIG. 1b, when the mouse is in a state in the process of switching between the state that the bottom of the shell is placed on the working surface to slide and the state that the outer surface of the shell is placed on the working surface to slide.
Figure 1G:
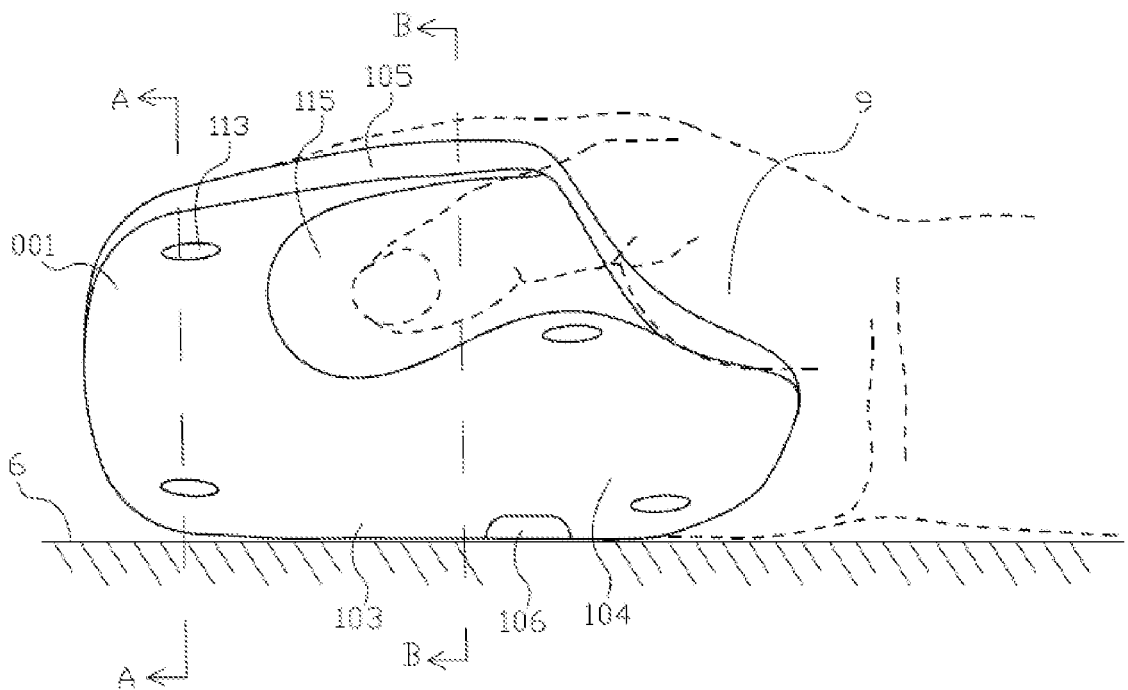
FIG. 1g depicts a schematic diagram of the mouse being in the state that the outer side of the shell is placed on the working surface and a hand operating the mouse provided by embodiment one of the present disclosure.

The mouse 001 herein can either sense the movement of the cursor by placing the bottom 104 of the shell on the working surface and sliding the bottom 104 of the shell on the working surface, where the mouse in this state likes a mouse which is commonly used by people currently, is held to operate by putting the palm on the shell in a grasping manner, or sense the movement of the cursor by placing the outer side 103 of the shell on the working surface to slide, as shown in FIG. 1e and FIG. 1g. Due to the beneficial arrangement in the aforesaid technical solution, the operation of the cursor can be uninterrupted and frame loss can be avoided when switching between the two operation postures is performed.

Further, when the mouse 001 is switched between the two states, according to the further arrangement which has beneficial effects and will be described hereinafter, the operable hand can conveniently switch the operation postures between the two states, there is no need to stop the operation of pressing keys and the scroll wheel when the operation postures are switched, so that an occurrence of "cursor drift" is avoided, and an occurrence of "cursor movement standstill" is further avoided from the aspect of operations of the fingers and the palm.

Please refer to FIG. 1a, FIG. 1b, FIG. 1g, FIG. 1g, FIG. 1i, a notch 110 is formed in the inner side of the rear half part of the shell of the mouse 001, and is configured to receive a thenar eminance part 9 which is protruded downwards from the palm because that the thumb holds the bottom of the shell, when the outer shell 103 is placed on the working surface to slide so as to sense the movement state of the cursor. The notch 110 enables an inner side and an outer side of the rear end of the shell be obviously asymmetric in shape, the inner side of the shell has a notched shape as compared to the outer side of the shell, and the tail end 1091 of the rear end of the shell is deflected towards the outer side of the shell. In the mouse 001 of this embodiment, the notch 110 is concave arc-shaped and is sunken from the inner side of the shell to the outer side of the shell, the sunken part is not lower in the middle and higher in two ends, instead, the rear end 109 of the shell is becoming narrower and narrower from the sunken part to the tail end 1091 of the rear end of the shell. That is, in the mouse 001, the notch 110 includes a concave arc-shaped shell inner side section 111 which is sunken towards the outer side of the shell.

Figure 1H:
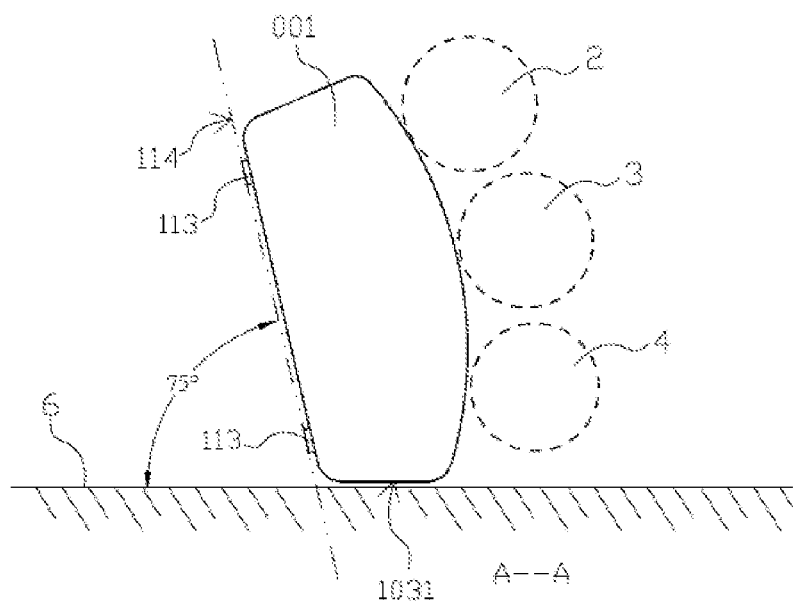
FIG. 1h depicts a cross-sectional schematic diagram along a A-A direction in FIG. 1g.
Figure 1I:
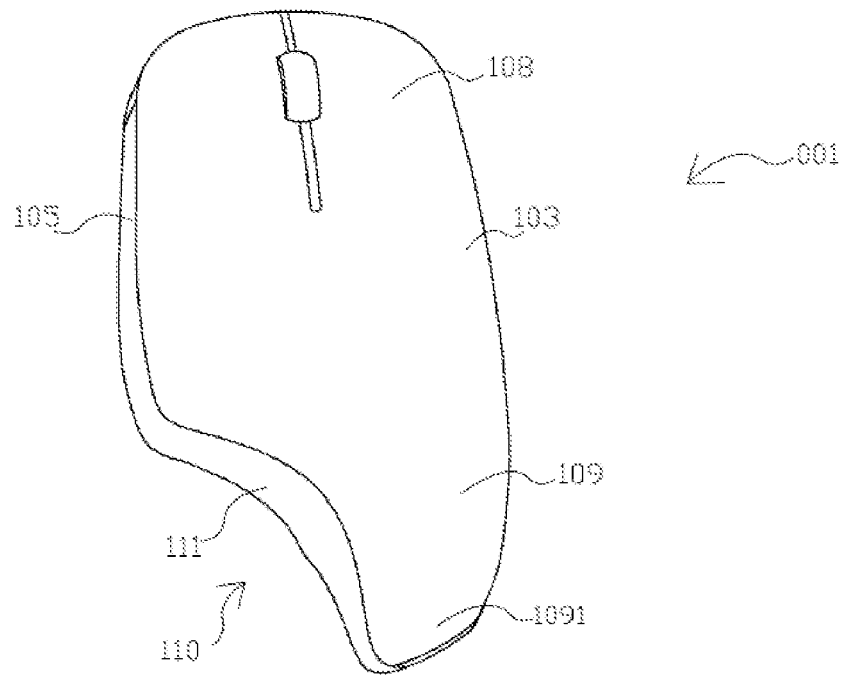
FIG. 1i depicts a schematic bottom diagram of the mouse provided by embodiment one of the present disclosure.
Figure 1J:
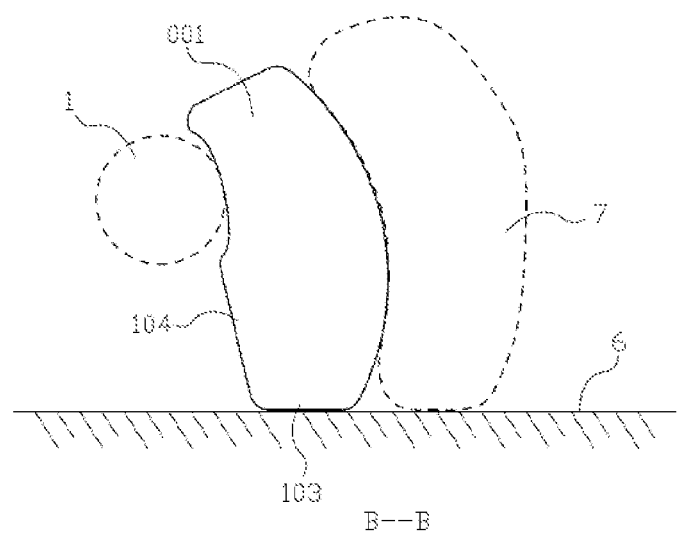
FIG. 1j depicts a cross-sectional schematic diagram along a B-B direction in FIG. 1g.

Referring to FIG. 1g and FIG. 1j, the thumb 1 is moved to the bottom of the shell, the mouse is held to lift up and move left and right by the resultant force of the thumb 1 and the palm part 7, which has the effect of holding the mouse to lift up and move left and right easily and conveniently.

Figure 2A:
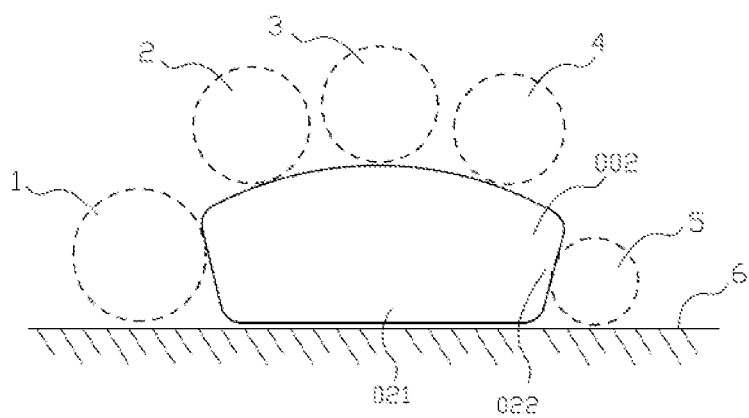
FIG. 2a depicts a cross-sectional schematic diagram of fingers operating the mouse and the front end of the shell, when the traditional mouse is in the state that the bottom of the shell is placed on the working surface.
Figure 2B:
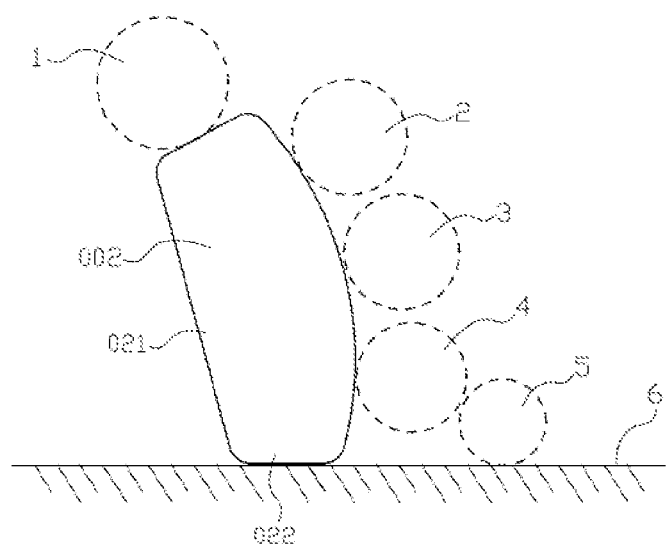
FIG. 2b depicts a cross-sectional schematic diagram of fingers operating the mouse and the front end of the shell, when the traditional mouse is in the state that the outer side of the shell is placed on the working surface.

Please refer to FIG. 2a and FIG. 2b, the mouse 002 is a traditional mouse, FIG. 2a depicts a cross-sectional schematic diagram of the fingers that operate the mouse and the front part of the shell when the mouse 002 is in the state that the bottom 021 of the shell is placed on the working surface 6, at this time, the thumb 1, the index finger 2, the middle finger 3, the ring finger 4 and the litter finger 5 are disposed on the inner side, the top surface and the outer side of the shell respectively. FIG. 2b depicts the state of the mouse 002 that the outer side of the shell is placed on the working surface, the thumb 1 is disposed at the inner side of the shell, since the little finger or the ring finger and the little finger are not disposed on the outer side of the shell, at this time, it is hard to lift the mouse 002 away from the working surface by the resultant force of the thumb and other four fingers.

Figure 3:
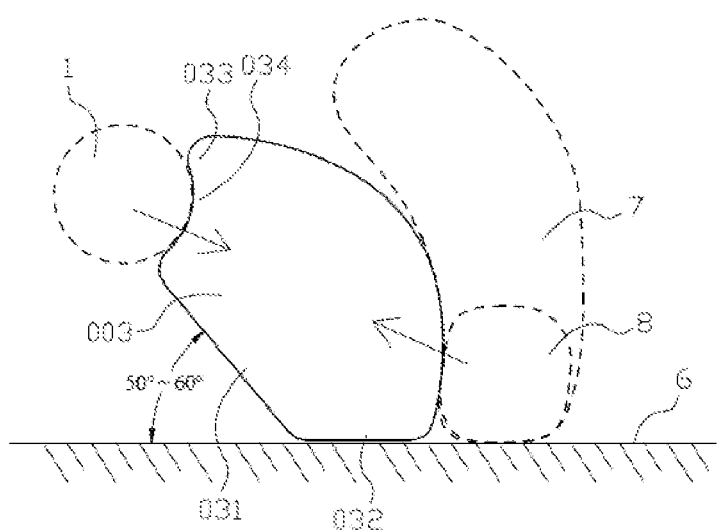
FIG. 3 depicts a cross-sectional schematic diagram of a thumb of the hand operating the mouse, the palm of the hand, and a middle and rear part of the shell, when the traditional mouse is in the state that the outer side of the shell is placed on the working surface.

The mouse 003 shown in FIG. 3 is another traditional mouse, the inner side 033 of the shell is provided with a concave position 034 configured to receive the thumb 1, so that force can be applied to the outer side of the shell conveniently, moreover, the top surface of the middle part and the middle and rear part of the shell corresponding to the palm part 7 is set to be the cross section of the shell which is higher in middle bulge and lower in two ends, and the included angle between the bottom 031 of the shell and the working surface ranges from 50 degrees to 60 degrees when the mouse is set to be in the state that the outer side 032 of the shell is placed on the working surface, that is, the angle formed by turning over the bottom surface 031 of the shell from the working surface towards the outer side ranges from 50 degrees to 60 degrees, under this condition, the little finger retracts back from the outer side of the shell, and the little finger, the finger ring, the middle finger and the index finger are arranged side by side substantially instead of being staggered outwards, the root of the little finger can apply force to the inner side of the shell, and the palm part does not need to make an adjustment of moving towards the inner side of the shell on the middle and rear part of the shell in the angle range ranging from 50 degrees to 60 degrees formed by turning over the mouse outwardly. Thus, force is applied to the outer side of the shell from the inner side of the shell by means of the thumb 1, the little finger root muscle group 8 abuts against the outer side of the middle bulge in the middle and rear part of the shell and applies force to the inner side of the shell, so that the mouse 003 can be lifted and moved leftwards and rightwards. In this situation, the thumb need not to be moved to the bottom of the shell; however, holding is hard and is uneasy, and key pressing operation of the ring finger is inconvenient due to the fact that the root of the little finger needs to apply force to the inner side of the shell.

Thus, in the mouse 001 provided by embodiment one of the present disclosure, the beneficial effects of the notch 110 are as follows: first, as described above, when the mouse switches from the state that the bottom of the shell is placed on the working surface to slide to the state that the outer side of the shell is placed on the working surface to slide so as to sense the movement state of the cursor, the thumb is moved to the bottom of the shell and holds the mouse by matching with the palm part on the top surface of the shell in the manner of clamping the shell, this is the holding manner which is high in force applying efficiency and is easy and convenient to use, the mouse can be easily and conveniently held to lift up or moved leftwards and rightwards. However, the thenar eminence part of the palm moves towards the inner side of the shell with the movement of the thumb, and the thenar eminence muscle group protrudes downwards with downward bend of the thumb, as shown in FIG. 1g, for this reason, the inner side of the rear end of the shell is provided with the notch 110 configured to receive the thenar eminence part 9 of the palm which protrudes downwards, so that the rear part of the palm part of the palm and the wrist part can be prevented from being suspended from the working surface, and therefore an operation pause caused by a backward adjustment action which needs to be performed by the palm part of the palm and the fingers that operates the keys and the scroll wheel is avoided. Without the gap, the rear part of the palm part of the palm and the wrist part may perhaps be lifted up to be higher than the working surface, and the fingers operating the keys and the scroll wheels may be inclined with respect to the keys and scroll wheel, so that it is inconvenient to operate; or as an alternative, the whole of the palm needs to be moved backwards, so that the thenar eminence part which protrudes downwards is not clogged; however, the fingers that operate the keys and the scroll wheel are also moved backwards and fail to be corresponding to the original positions of operating the keys and the scroll wheel, and thus operation pause and inconvenient operation are caused.

Secondly, due to the existence of the notch 110, the thenar eminence part 9 which protrudes downwards the palm is located in the notch, the thenar eminence muscle is not clogged in the inner side of the rear end of the shell, it is convenient for the muscle group in the thenar eminence and the thumb muscle tendon to apply force, so that they can be easily and efficiently matched with the palm part to hold the mouse, and the mouse can be lifted up and moved leftwards and rightwards conveniently only by the thumb and the palm part, such that the fingers such as the index finger and the middle finger that operate keys and the scroll wheel are not influenced when the mouse switches from placing the bottom of the shell on the working surface to slide into placing the outer side of the shell on the working surface to slide so as to sense the movement of the cursor and the operation of the keys and the scroll wheel is not stopped.

Furthermore, due to the existence of the notch 110, when the mouse is turned over towards the outer side, the thumb can be moved from the notch 110 to the bottom of the shell, thus, when the operation posture is switched, it is convenient to move the thumb to the bottom of the shell, and it is convenient for the thumb to be received.

As can be seen from the contents mentioned above and the subsequent embodiment five, this is not the unique technical solution having the beneficial effect. Moreover, in the mouse 003 shown in FIG. 3 as mentioned above, the mouse may also be lifted up and moved leftwards and rightwards without moving the thumb to the bottom of the shell, and thus there is no need to dispose the notch 110 on the inner side of rear end of the shell or the inner side of the rear half of the shell.

Please refer to FIG. 1a, FIG. 1g and FIG. 1j simultaneously, the bottom 104 of the shell of the mouse 001 is provided with a depression 115 which is sunken towards the top surface of the shell from the bottom surface 1041 of the shell to receive the thumb that operates the mouse when the outer side of the shell is placed on the working surface to slide so as to sense the movement state of the cursor, so that it is convenient for the thumb at the bottom of the shell to hold the mouse together with the palm part of the palm. In the mouse 001 in embodiment one, the depression 115 extends towards the front end of the shell from a recess 116 which is arranged in the notch 110 in the inner side of the shell and have an downward opening and is slightly deflected toward the outside of the shell. The recess 116 having the downward opening is corresponding to the position where the second section of the thumb is pressed on when the bottom of the shell is placed on working surface, so that the thumb can be moved from the notch 110 to the bottom of the shell conveniently when the shell is turned over towards the outer side.

When the mouse 001 is in the state that the bottom 104 of the shell is placed on the working surface 6 to slide so as to sense the movement state of the cursor, each foot pad 113 at the bottom 104 of the shell is in contact with the working surface 6, when the mouse is in the state that the outer side of the shell is placed on the working surface 6 to slide so as to sense the movement state of the cursor, an included angle between the plane 114 where the bottom of each foot pad 113 at the bottom 104 of the shell of the mouse 001 are located and the working surfaces is 75 degrees, as shown in FIG. 1h. In other embodiments of the present disclosure, the bottom of some shells are not provided with the foot pad, for example, when the bottom of the shell is placed on the working surface to slide so as to sense the movement state of the cursor, it is the two lowest surfaces or the lowest points at the front end and the rear end of the shell which are in contact with the working surface; in other embodiments of the present disclosure, when the outer side of the shell is placed on the working surface to slide so as to sense the movement state of the cursor, the included angle formed between the plane where the bottom surface of each foot pad at the bottom of the shell are located, or the lowest points which are contacted with the working surface, or the plane where the lowest points are located when the bottom of the shell is placed on the working surface to slide so as to sense the movement state of the cursor and the working surface ranges from 50 degrees to 85 degrees. According to this arrangement, the beneficial effects are as follows:

Firstly, when the included angle is larger than 90 degrees, the shell is formed to be inclined outwards, when the mouse is switched from placing the bottom of the shell on the working surface to slide into placing the outer side of the shell on the working surface to slide so as to sense the movement of the cursor, the index finger, the middle finger, the ring finger for operating the keys and the scroll wheel and the palm part need to make an action of moving towards the inner side of the shell on the top surface of the shell, such that the index finger, the middle finger, the ring finger and the palm part are greatly deviated from their original positions, and operation pause and inconvenient operation may be caused.

Secondly, when the included angle is equal to or close to 90 degrees, such as between 85 degrees and 90 degrees, when the outer side of the shell is placed on the working surface to slide so as to sense the movement state of the cursor, the front end of the shell is prone to be shaken when the keys are operated, so that the "cursor drift" is generated. In order to avoid the keys from being triggered unnecessarily, the fingers are suspended beside the positions of the key before the keys are pressed, and the actions of the keys are usually the actions of fast clicking the keys by fingers, when the included angle is equal to or close to 90 degrees, keys are clicked by the fingers which are parallel to working surface, the working face fails to bear the decomposition force when the keys are pressed, therefore, the front end of the shell is prone be easily shaken.

Thirdly, when the included angle is smaller than 50 degrees, the mouse is also in a poor arrangement. In one aspect, at this time, the center of gravity of the mouse has been deviated from the outer side of the shell which is supported by the working surface, meanwhile, a force application center for holding the mouse by virtue of the resultant force of the thumb and the palm part has also deviated from the outer side of the shell which is supported by the working surface, and a part of force cannot be naturally and easily applied to the outer side of the shell to enable the shell to slide stably on the working surface, such that the inner side of the mouse is very prone to fall down; thus, the outer side of the shell is prone to shake up and down to generate the cursor drift and cursor standstill when the outer side of the shell is placed on the working surface so as to sense the movement of the cursor. In another aspect, the effect of turning over the wrist towards the outer side to release the compression tensing of the inner side surface of the wrist can't be achieved, and the effect of twisting the radius of the forearm to a non-distorted natural state is not achieved, either.

In conclusion, due to the beneficial arrangement in the aforesaid technical solution, when the mouse 001 in the embodiment one switches postures between the aforesaid two operation states, the mouse won't lose frames, the movement of the cursor may be uninterrupted, and an adjustment action that generates negative effects when switching between the two operation postures can be avoided, the wrist and the palm can conveniently switch operation postures between the two operation states without stopping the operations of the keys and the scroll wheel, and thus the occurrence of cursor standstill and cursor drift is avoided.

Embodiment Two

Figure 4:
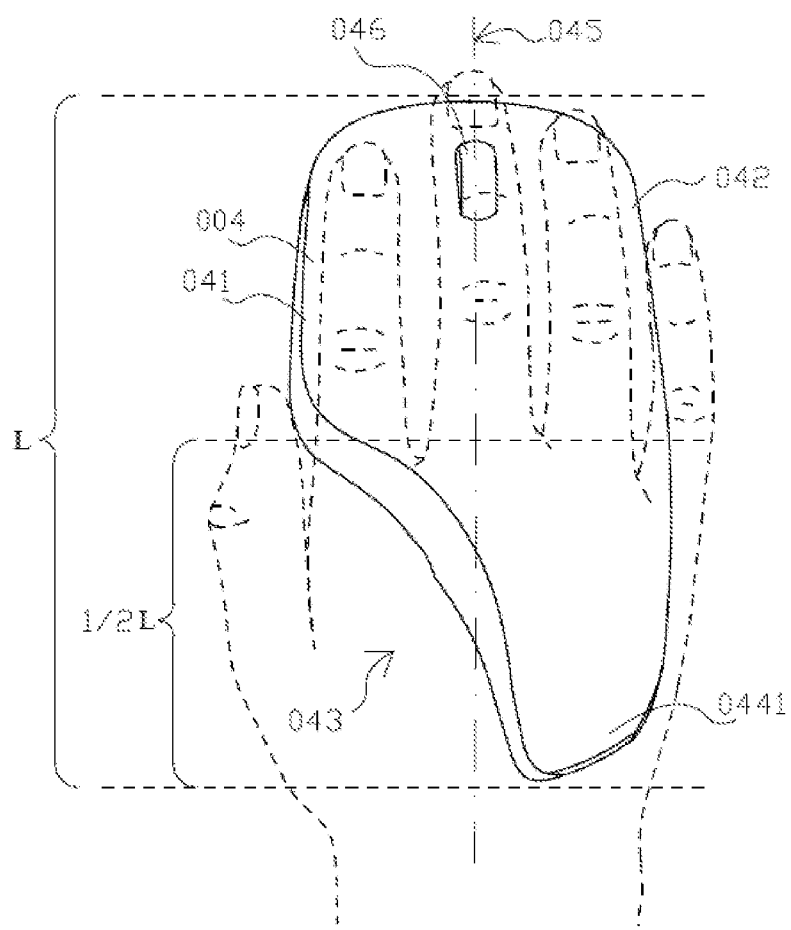
FIG. 4 depicts a schematic top view of a mouse and a hand operating the mouse provided by embodiment two of the present disclosure.

Referring to FIG. 4, the difference between the mouse 004 provided by embodiment two of the present disclosure and the mouse 001 provided by embodiment one is embodied in that: a notch 043, which is configured to receive downwards protruded thenar eminence part of the palm when the outer side of the shell is placed on the working surface to slide so as to sense the movement state of the cursor, is arranged to extend from half of the longitudinal length of the shell to the inner side of the most rear end of the shell, that is, the notch 043 takes up the length range of the inner side of the whole rear half part of the shell, and the arrangement of the notch 043 also has the beneficial effects described above. However, please refer to the position where the thumb holds on the inner side 041 of the shell as shown in FIG. 4, assuming that the range of the notch 043 is extended more forwards and exceeds a half of the longitudinal length of the shell, when the outer side of the shell is placed on the working surface to slide so as to sense the movement state of the cursor, the thumb needs to be placed on the inner side at the even further position of the front end of the shell to hold the mouse, and the palm part moves forwards with the thumb; when the mouse switches into placing the outer side of the shell on the working surface to slide so as to sense the movement state of the cursor, inconvenience in operation of the keys and the scroll wheel is caused. Although people have different sizes of palms, the relative proportions of the parts of the palms are basically the same. Therefore, for the convenience of holding and operating the keys and scroll wheel before and after switching postures, and for avoiding unnecessary adjustment actions, the notch 043 should be arranged on the inner side of the rear half part of the shell, for example, the notch 110 of the mouse 001 in the embodiment one is arranged on the inner side of the rear end of the shell. FIG. 4 further depicts that, the tail end 0441 at the rear end of the shell of the mouse 004 is deflected towards the outer side of the shell of the longitudinal section 045 which passes the center line of the thickness of the scroll wheel 046 and is perpendicular to an axial direction of the scroll wheel.

Embodiment Three

Figure 5:
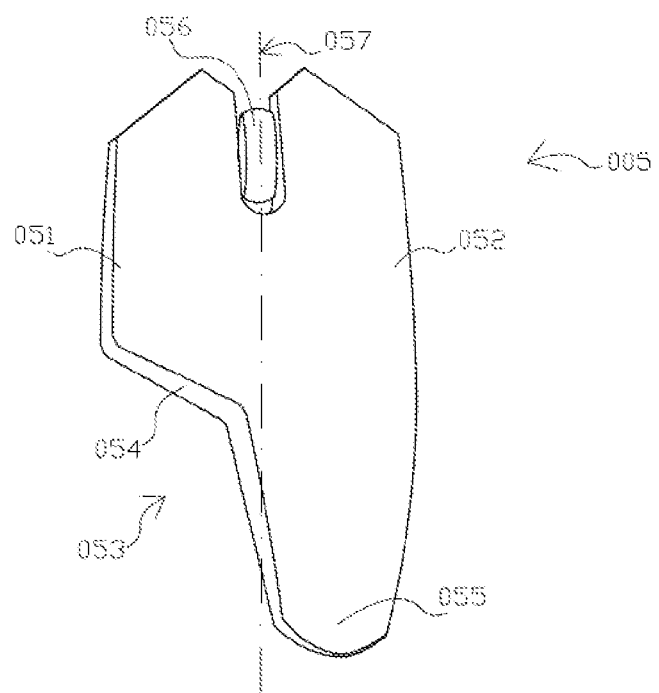
FIG. 5 depicts a schematic bottom view of a mouse provided by embodiment three of the present disclosure.

Referring to FIG. 5, the main difference between the mouse 005 provided by embodiment three of the present disclosure and the mouse 001 provided by embodiment one is embodied in that: a notch 053, which is arranged at the inner side of the half rear part of the shell of the mouse 005 and is configured to receive the downwards protruded thenar eminence part of the palm when the outer side of the shell is placed on the working surface to slide so as to sense the movement state of the cursor, includes an inner side section 054 of the shell which is in a straight inclined shape and is deflected towards the outer side of the shell. As compared to the notch 110 of the mouse 001 which includes a concave arc shaped shell inner side section 111 that is sunken towards the outer side of the shell, the mouse 005 and the mouse 001 have different notch shapes.

The main difference between the mouse 005 and the mouse 001 are also embodied in that: when the bottom of the shell is placed on the working surface 6 to slide so as to sense the movement state of the cursor, the mouse 005 slides on the working surface by contacting the working surface with the lowest surface at the front end and the rear end of the bottom of the shell thereof, when the outer side of the shell is placed on the working surface to slide so as to sense the movement state of the cursor, an included angle of 60 degrees is formed between the plane where the lowest surface at the front end and the rear end of the bottom of the shell are located and the working surface. Moreover, the front end and the rear end of the outer side of the mouse 005 are respectively provided with a convex strip configured to slide so as to sense the movement state of the cursor when the outer side of the shell is placed on the working surface, and the mouse 005 slides on the working surface by contacting the convex strip arranged at the front end and the rear end of the outer side of the shell.

Embodiment Four

Figure 6A:
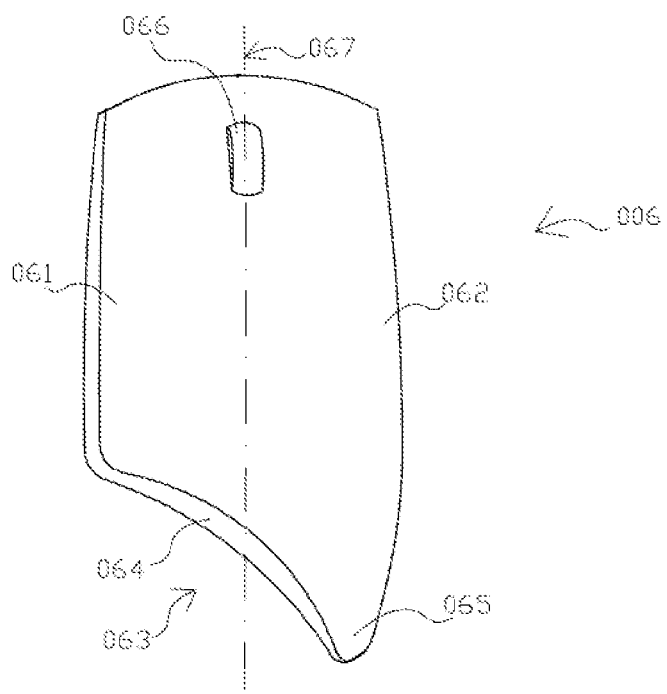
FIG. 6a depicts a schematic top view of a mouse provided by embodiment four of the present disclosure.
Figure 6B:
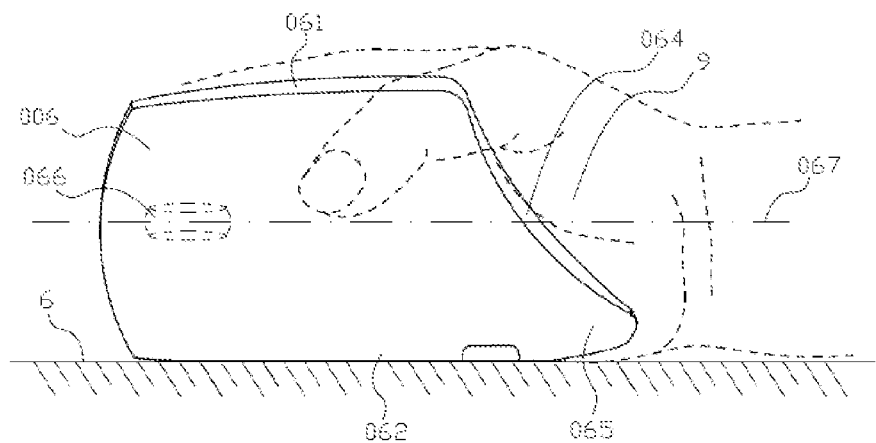
FIG. 6b depicts a schematic diagram of the mouse being in the state that the outer side of the shell is placed on the working surface and a hand operating the mouse.

Please refer to FIG. 6a and FIG. 6b, the main difference between the mouse 0006 provided by embodiment four of the present disclosure and the mouse 001 provided by embodiment one is embodied in that: a notch 063, which is arranged at the inner side of the half rear part of the shell of the mouse 006 and is configured to receive the downwards protruded thenar eminence part of the palm when the outer side of the shell is placed on the working surface to slide so as to sense the movement state of the cursor, includes a concave arc shaped shell rear end inner side section 064 which extends from the rear end of the shell to the tail end of the rear end of the shell, is deflected towards the outer side of the shell from the inner side 061 of the shell and is sunken towards the outer side of the shell, and has the same or nearly the same points of curvature, such that the tail end 065 of the rear end of the shell is deflected towards the outer side of the shell of the longitudinal section 067 which passes the center line of the thickness of the scroll wheel 066 and is perpendicular to the axial direction of the scroll wheel, and is seriously deflected towards the longitudinal section 067, such that the tail end 065 of the rear end of the shell is narrowed to be in a sharp angle shape. As compared to the concave arc shaped inner side section 111 which is included in the notch 110 of the mouse 001 and a concave arc of the notch 110 is provided with bends with curvatures becoming obviously greater, the mouse 006 and the mouse 001 have different notch shapes.

The main difference between the mouse 006 and the mouse 001 is also embodied in that: when the bottom of the shell is placed on the working surface 6 to slide so as to sense the movement state of the cursor, the mouse 006 slides on the working surface by contacting the working surface with the lowest surface at the front end and the rear end of the bottom of the shell thereof, when the outer side of the shell is placed on the working surface to slide so as to sense the movement state of the cursor, an included angle of 85 degrees is formed between the plane where the various lowest points at the front end and the rear end of the bottom of the shell are located and the working surface.

Embodiment Five

Please refer to FIG. 7a, FIG. 7b, FIG. 7c and FIG. 7d, the main difference between the mouse 0007 provided by embodiment five of the present disclosure and the mouse 001 provided by embodiment one is embodied in that: the aforesaid light-transmissive hole 215 is arranged on the seamed edge where an outer side wall 2061 intersects with an extending surface of the bottom surface 2041 of the shell. Please refer to FIG. 7a and FIG. 7c, the outer side wall 2061 doesn't interact with the bottom surface 2041 of the shell physically, instead, the light-transmissive holes 215 is arranged on the seamed edge where an extending surface of the outer side wall 2061 and the extending surface of the bottom 2041 of the shell are intersected, the technical effects in the technical solution of the present disclosure is also generated.

The main difference between the mouse 007 and the mouse 001 is also embodied in that: the inner side of the rear end of the shell of the mouse 007 is not provided with a notch which is formed by obviously sinking from the inner side of the shell towards the outer side of the shell, what is the same is embodied in that the inner side and the outer side of the rear end of the shell are in an obviously asymmetric shape, the tail end of the rear end of the shell is deflected towards the outer side of the shell. Please refer to FIGS. 7a-7d, according to the selection of the mouse which is commonly used by people by usually placing the palm on the shell in a prostrate mode for holding and operating the mouse, a wider part at the top surface of the front end of the mouse, such as the width of the axis part of the scroll wheel is arranged to be slightly wider than the width of the index finger, the middle finger and the ring finger side by side, but is slightly narrower than the width of the palm part, the scroll wheel 203 is arranged between the left key and the right key and is arranged at the transverse middle part of the top surface of the front end of the shell. Although the inner side of the rear end of the shell of the mouse 007 is not provided with an obvious notch, the tail end 2021 of the shell is straight inclined shaped and is deflected towards the outer side 206 of the shell, starting from a certain position between the rear end and ⅓ position of the front end to the tail end 2021 of the rear end of the shell in the longitudinal length of the shell, and the tail end 2021 of the rear end of the shell is deflected towards the outer side of the shell of the longitudinal section 211 which passes the center line of the thickness of the scroll wheel 203 and is perpendicular to the axial direction of the scroll wheel. The longitudinal section 211 which passes the center line of the thickness of the scroll wheel and is perpendicular to the axial direction of the scroll wheel is equivalent to a symmetric center line section of the top surface of the front end of the shell. When the outer side 206 of the shell is placed on the working surface to slide so as to sense the movement state of the cursor, the thumb is moved to the bottom of the shell and is bent downwards so as to hold the mouse by cooperating with the palm part, the lower part of the thenar eminence part 9 which protrudes downwards from the palm is arranged at the rear end of the palm part, and is usually lower than ½ of the width of the palm part. Correspondingly, as shown in the figures, according to this arrangement, the width of the tail end 2021 at the rear end of the shell is smaller than ½ of the width of the top surface of the front end of the shell on the axis part of the scroll wheel, this arrangement has the following advantages: the rear part of the inner side of the shell of the mouse 007 has an unfilled corner as compared to the outer side of the shell, the unfilled corner at the rear part of the shell enables the outer side of the shell to have an notch on the top of the inner side of the rear part of the shell, and the notch is configured to receive the thenar eminence part 9 which is protruded downwards due to the fact that the thumb is moved to the bottom of the shell and is bent downwards, the rear end of the palm part and the wrist part are prevented from being lifted up; and it is convenient for the muscle group in the thenar eminence and the thumb tendon to apply force, so that the thumb can be easily and efficiently cooperated with the palm part to hold the mouse; and the thumb can be conveniently moved to the bottom of the shell or be moved from the bottom of the shell to the inner side of the shell when the operation posture is switched, which has the similar beneficial effects with the arrangement of the notch which is arranged at the inner side of the rear half part of the shell and is configured to receive thenar eminence part which protrudes downwards from the palm.

The main difference between the mouse 007 and the mouse 001 is also embodied in that: when the bottom of the shell is placed on the working surface 6 to slide so as to sense the movement state of the cursor, the mouse 007 is contracted with the working surface at the bottom surface 2041 of the shell which is parallel to the working surface, and the mouse 007 slides on the working surface, when the outer side of the shell is placed on the working surface to slide so as to sense the movement state of the cursor, an included angle of 80 degrees is formed between the bottom surface 2041 of the shell and the working surface.

Figure 7A:
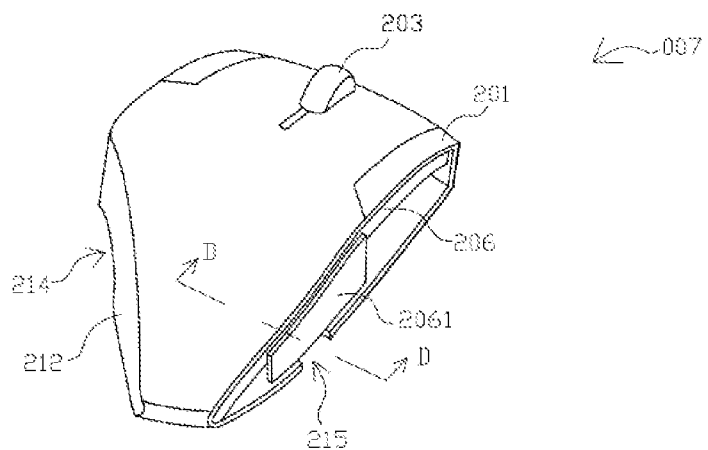
FIG. 7a depicts a stereoscopic schematic diagram of the mouse provided by embodiment five of the present disclosure.
Figure 7B:
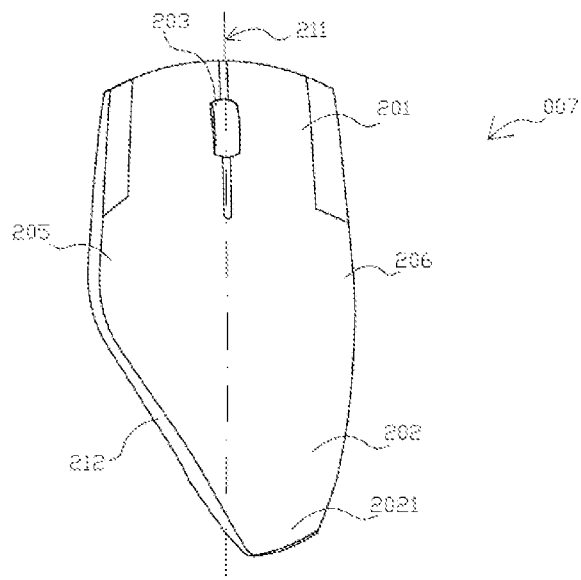
FIG. 7b depicts a stereoscopic schematic diagram of the mouse in another viewing angle provided by embodiment five of the present disclosure provided by embodiment four of the present disclosure.
Figure 7C:
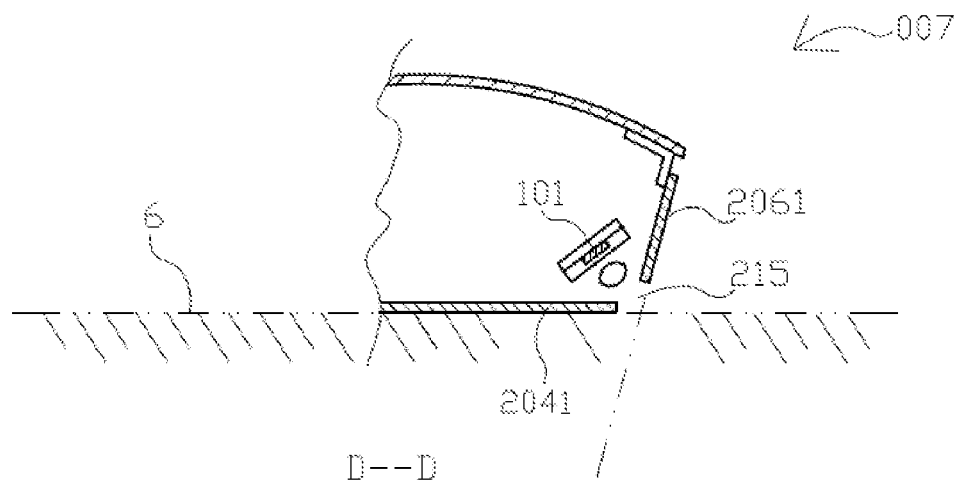
Figure 7D:
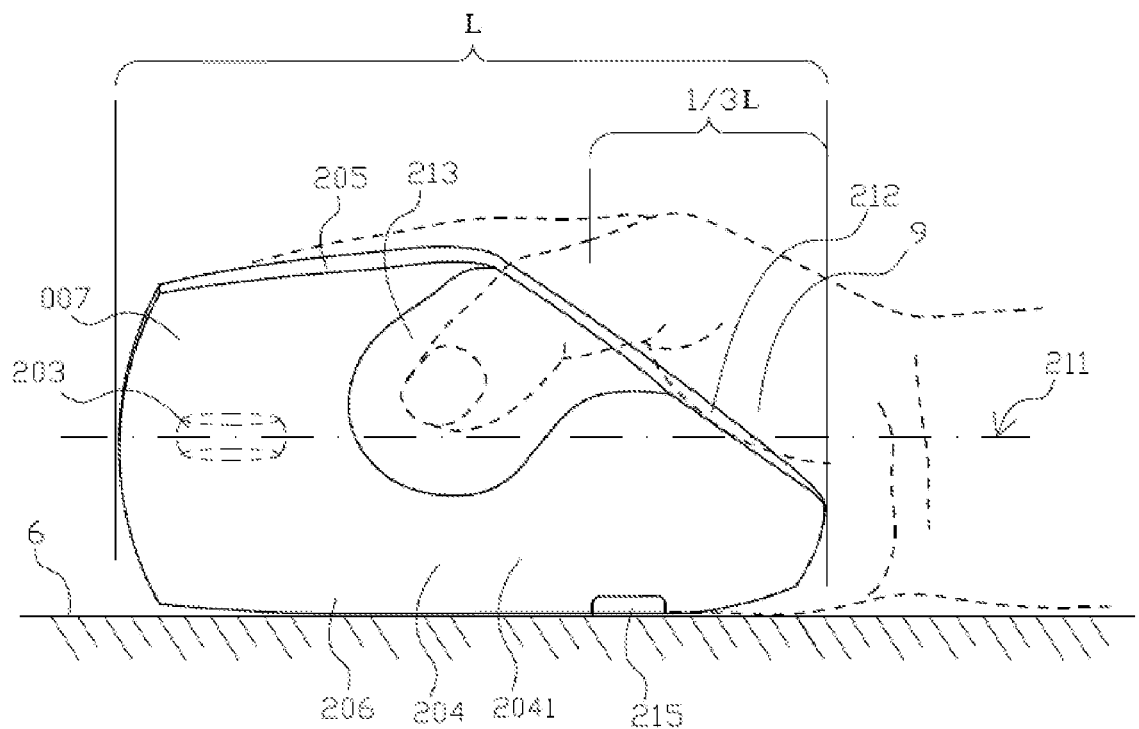
FIG. 7d depicts a schematic diagram of the mouse in the state that the outer side of the shell is placed on the working surface and a hand operating the mouse.

Please refer to FIG. 7a and FIG. 7d, the bottom 204 of the shell of the mouse 007 is provided with a depression 213 which is sunken towards the top surface of the shell from the bottom surface 2041 of the shell, and is configured to receive the thumb of the hand for operating the mouse when the outer side 206 of the shell is placed on the working surface to slide so as to sense the moving state of the cursor, so that it is convenient for the mouse to be held by the resultant force of the thumb and the palm part. The depression 213 is a recess 214 which extends towards the outer side of the shell from a recess arranged at the inner side of the shell and having a downward opening, and is deflected towards the front end of the shell.

Embodiment Six

Figure 8:
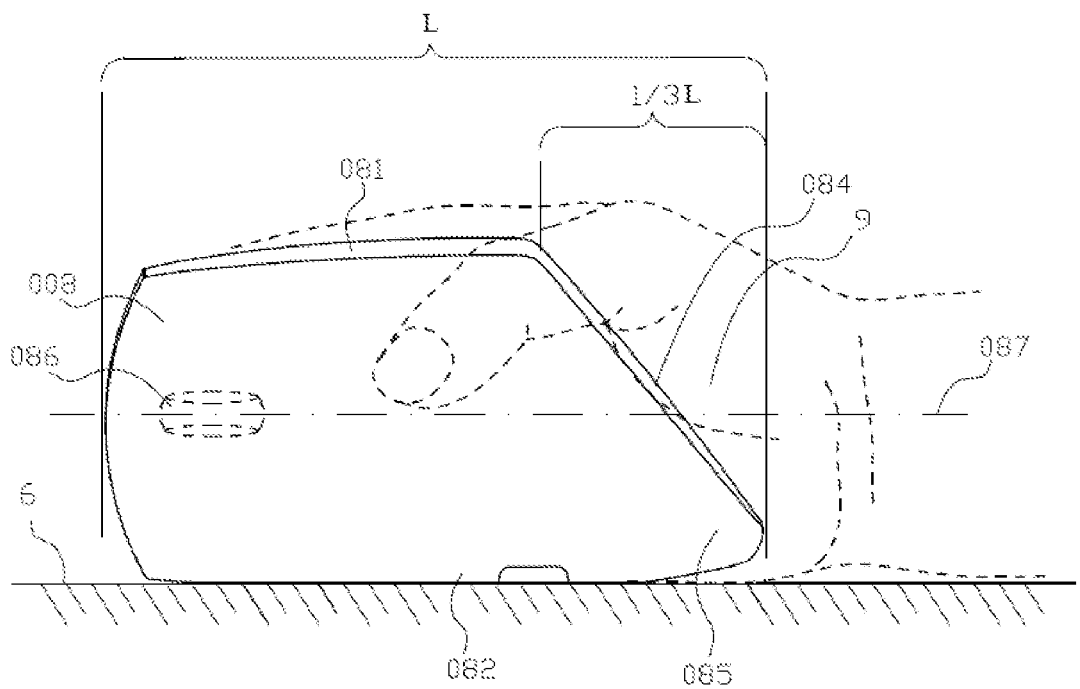
FIG. 8 depicts a schematic diagram of the mouse being in the state that the outer side of the shell is placed on the working surface and a hand operating the mouse provided by embodiment six of the present disclosure.

Referring to FIG. 8, the main difference between the mouse 008 provided by embodiment five and the mouse 007 provided by embodiment five is embodied in that: starting from ⅓ position from the rear end to the front end in the longitudinal length of the shell, the inner side 081 of the shell of the mouse 8 is in a straight inclined shape and is deflected towards the outer side 082 of the shell, such that the tail end 085 of the rear end of the shell is deflected towards the outer side of the shell of the longitudinal section 087 which passes the center line of the thickness of scroll wheel 086 and is perpendicular to the axial direction of the scroll wheel. Here, it can be seen that, under the condition that the tail end 085 of the rear end 085 of the shell of the mouse 8 has been deflected towards the outer side of the shell as much as possible, when the outer side of the shell is placed on the working surface to slide so as to sense the movement state of the cursor, the notch formed between the inner side section 084 of the rear end of the shell which is inclined towards the outer side of the shell, and the end surface at the rear end of the shell can just receive the thenar eminence part 9 which protrudes downwards from the palm, as shown in FIG. 8. It can be seen that, if the inner side of the shell is in a straight inclined shape and is deflected towards the outer side of the shell starting from certain position between the rear end and ⅓ position of the front end in the longitudinal length of the shell to the tail end of the rear end of the shell, such that the tail end of the rear end of the shell is deflected towards the outer side of the shell of the longitudinal section which passes the center line of the thickness of scroll wheel 086 and is perpendicular to the axial direction of the scroll wheel, the aforesaid notch formed between the inner side section of the rear end of the shell inclined towards the outer side of the shell and the end surface at the rear end of the shell cannot receive the thenar eminence part which protrudes downwards from the palm. At this moment, the whole palm must be moved backwards in order that the thenar eminence part would not be clogged, which generates adjustment actions of the whole palm including the fingers for operating the keys and scroll wheel, operation pause and the cursor drift are caused, the coherence of operation is influenced, moreover, the longitudinal length of the shell left in the palm part is shortened, so that the mouse cannot be held conveniently, which causes a lack of the resultant force of the thumb and the palm part for clamping the mouse.

Embodiment Seven

Figure 9:
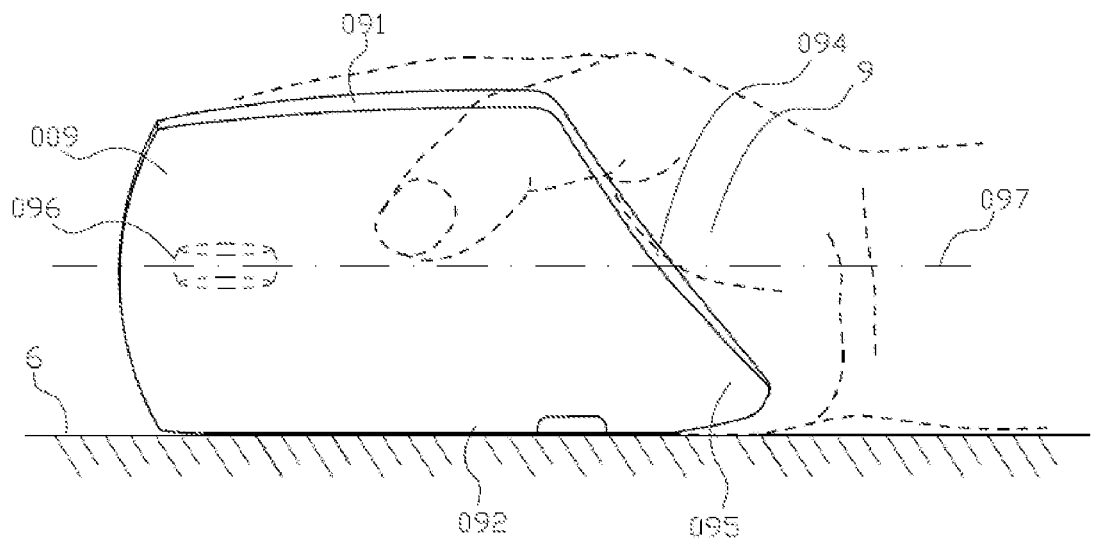
FIG. 9 depicts a schematic diagram of the mouse being in the state that the outer side of the shell is placed on the working surface and a hand operating the mouse provided by embodiment seven of the present disclosure.

Referring to FIG. 9, the main difference between the mouse 9 provided by embodiment seven and the mouse 008 provided by embodiment six is embodied in that: the inner side 091 of the shell of the mouse 09 is in a concave arc inclined shape and is deflected towards the outer side 092 of the shell, such that the tail end 095 of the rear end of the shell is deflected towards the outer side of the shell of the longitudinal section 097 which passes the center line of the thickness of scroll wheel and is perpendicular to the axial direction of the scroll wheel. Although the concave arc is one concave arc close to straight line, the inclined shape is kept, as compared to the mouse 008, the concave arc depression of the inner side section 094 of the rear end of the shell which is in the concave arc inclined shape still increases the space of the notch formed between the inner section 094 of the rear end of the shell and the end surface of the rear end of the shell when the outer side of the shell is placed on the working surface to slide so as to sense the movement state of the cursor, so that the thenar eminence part 9 which protrudes downwards from the palm can be received better; please refer to FIG. 6B again, if the inner side section 094 of the rear end of the shell which is in the concave arc inclined shape is sunken deeper and forms a more obvious depression, such as the depression as shown in FIG. 6B, this arrangement belongs to the condition of the mouse 006 according to embodiment four as mentioned above, the inner side section 064 of the rear end of the shell of the mouse 006 which has the concave arc shape enables the inner side of the rear end of the shell to form a notch 063 configured to receive the thenar eminence part which protrudes downwards from the palm when the outer side of the shell is placed on the working surface to slide so as to sense the movement state of the cursor.

Embodiment Eight

Figure 10:
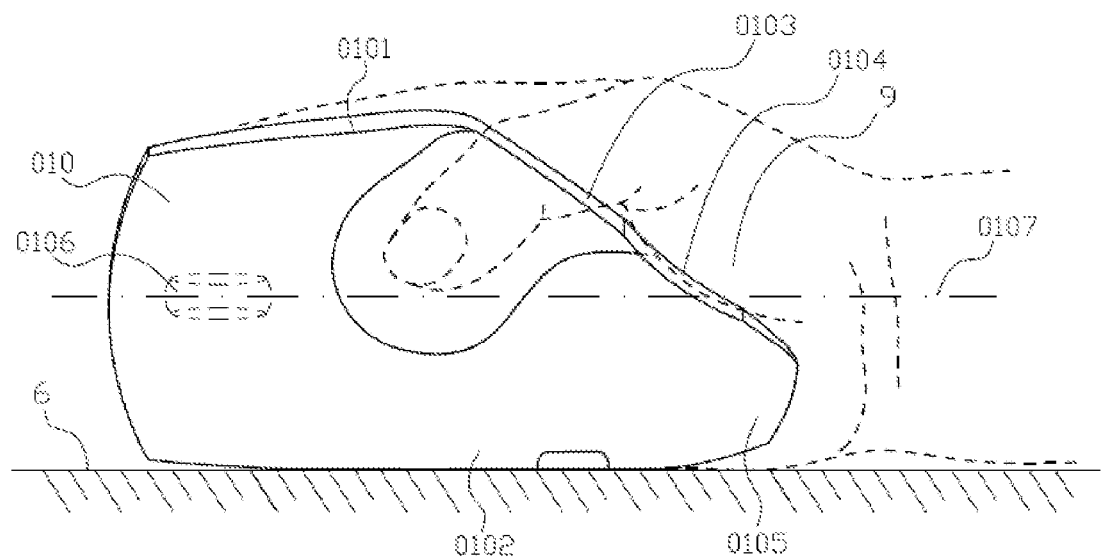
FIG. 10 depicts a schematic diagram of the mouse being in the state that the outer side of the shell is placed on the working surface and a hand operating the mouse provided by embodiment eight of the present disclosure.

Referring to FIG. 10, the difference between the mouse 7 provided by embodiment eight and the mouse 007 provided by embodiment five is embodied in that: the inner side 0101 of the shell includes a concave arc section which is inclined towards the outer side of the shell and enables the tail end of the rear end of the shell to be deflected towards the outer side of the shell of the longitudinal section 0107 which passes the center line of the thickness of the scroll wheel and is perpendicular to the axial direction of the scroll wheel; the inner side section 0103 which is inclined and is deflected towards the outer side of the shell includes a concave arc section 0104, although the concave arc section 0104 is in a slight concave arc shape close to straight line, which enables the inner side section 0103 of the shell to keep inclined and be deflected towards the outer side of the shell, as compared to the straight inclined section 212 of the mouse 7, when the outer side of the shell is placed on the working surface to slide so as to sense the movement state of the cursor, the concave arc section increases the space of notch formed between the inclined section 0103 of the inner side of the shell and the end surface at the rear end of the shell, so that the thenar eminence part 9 which protrudes downwards from the palm can be received better.

Embodiment Nine

Figure 11:
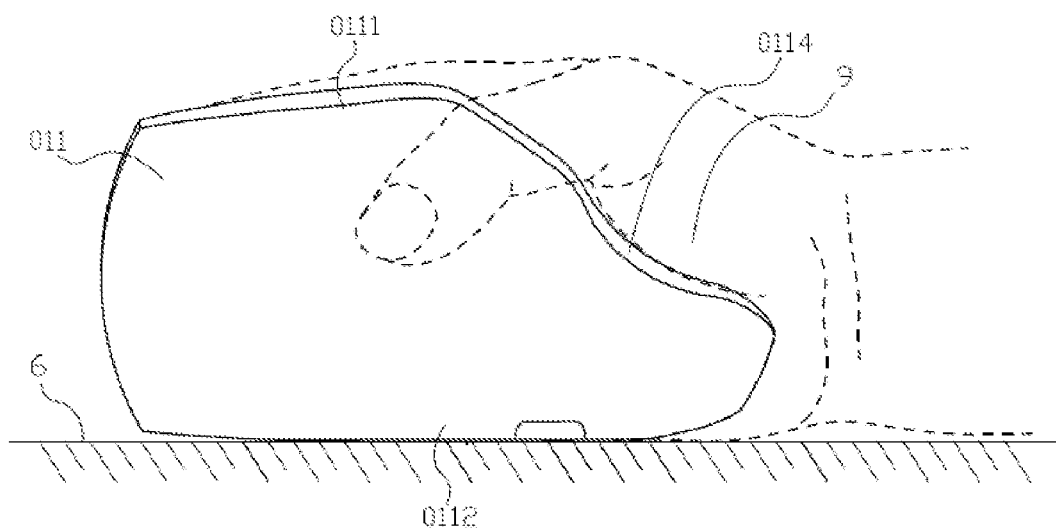
FIG. 11 depicts a schematic diagram of the mouse being in the state that the outer side of the shell is placed on the working surface and a hand operating the mouse provided by embodiment nine of the present disclosure.

Referring to FIG. 11, the difference between the mouse 011 provided by embodiment nine and the mouse 010 provided by embodiment eight is embodied in that: if the depression of the concave arc section included in the inner side of the shell of the mouse 010 is sunken deeper, and the depression is more obvious, the concave arc section of the mouse 011 which is obviously recessed and the inner side section 0112 of the shell which is inclined and is deflected towards the outer side 0112 of the shell form the notch at the rear half part of the inner side 0111 of the shell, this arrangement belongs to the condition of arranging a notch at the inner side of the rear half part of the shell.

The aforementioned embodiments are only preferred embodiments of the present disclosure, and should not be regarded as being limitation to the present disclosure. Any modification, equivalent replacement, improvement, and the like, which are made within the spirit and the principle of the present disclosure, should all be included in the protection scope of the present disclosure.

What is claimed is:

1. A mouse, comprising:
    a shell which comprises a bottom, a front end, a rear end, an inner side, and an outer side;
    wherein a top surface of the front end is provided with a left key, a right key and a scroll wheel disposed between the left key and the right key;
    an image sensing element;
    a light-transmissive region disposed at a seamed edge where an outer side wall of the shell is intersected with a bottom surface of the shell, or at a seamed edge where an extending surface of the outer side wall is intersected with an extending surface of the bottom surface;
    a light source configured to provide a light beam projected from the light-transmissive region to a working surface; and
    a lens configured to aggregate reflected light of the light beam on the working surface and direct the reflected light to the image sensing element;
    wherein the light beam is irradiated on the working surface through the same light-transmissive region when the mouse is either in a state that the bottom of the shell is placed on the working surface to sense the movement state of the cursor or in a state that the outer side of the shell is placed on the working surface to sense the movement state of the cursor, and the image sensing element obtains images from the same continuous region on the working surface through the same light-transmissive region in the two states and in the conversion process between the two states, and the light beam is not blocked by the seamed edge where the outer side wall of the shell is intersected with the bottom surface of the shell, or by the seamed edge where the extending surface of the outer side wall is intersected with the extending surface of the bottom surface.

2. The mouse according to claim 1, wherein the image sensing element comprises a photo-sensitive surface, an included angle between the photo-sensitive surface and the working surface is $\alpha$ when the bottom is placed on the working surface to slide so as to sense a moving state of a cursor, and an included angle between the photo-sensitive surface and the working surface is $\beta$ when the outer side is placed on the working surface to slide so as to sense the movement state of the cursor, where $\alpha$ is equal to $\beta$.

3. The mouse according to claim 1, wherein a rear half part of the inner side is provided with a notch, the notch is configured to receive a thenar eminence of a palm when the outer side is placed on the working surface to slide so as to sense the moving state of the cursor, and to enable the inner side and the outer side of the rear end to be formed asymmetrically, and wherein a tail end of the rear end is deflected towards the outer side.

4. The mouse according to claim 1, wherein the inner side is in a straight inclined shape or is in a concave arc inclined shape or is in an inclined shape having a concave arc section and being deflected towards the outer side, which enables the tail end of the rear end of the shell to be deflected towards the outer side of the shell of the longitudinal section which passes a center line of a thickness of the scroll wheel and is perpendicular to an axial direction of the scroll wheel, starting from any position which ranges from the rear end to ⅓ location of the front end of the shell in a longitudinal length of the shell to the tail end of the rear end of the shell.

5. The mouse according to claim 3, wherein the notch is configured to enable the tail end of the rear end of the shell to be deflected towards the outer side of the shell of the longitudinal section which passes the center line of the thickness of the scroll wheel and is perpendicular to the axial direction of the scroll wheel.

6. The mouse according to claim 3, wherein the notch is in a concave arc shape which is sunken from the inner side to the outer side, and the concave arc shape is gradually narrowed from the middle to the tail end of the rear end.

7. The mouse according to claim 3, wherein the notch comprises an inner side section which is concave arc-shaped and is sunken towards the outer side.

8. The mouse according to claim 3, wherein the notch comprises an inner side section which is in a straight inclined shape and is deflected towards the outer side.

9. The mouse according to claim 3, wherein the notch comprises an inner side section which extends from the rear end of the shell to the tail end of the rear end of the shell, is deflected towards the outer side from the inner side and is sunken towards the outer side.

10. The mouse according to claim 1, wherein the bottom is provided with a depression which is sunken from the bottom surface of the shell towards the top surface of the shell, and the depression is configured to receive a thumb when the outer side is placed on the working surface to slide so as to sense the movement state of the cursor.

11. The mouse according to claim 10, wherein the depression is extended from a recess of the inner side having a downward opening towards the front end and is deflected towards the outer side.

12. The mouse according to claim 1, wherein when the outer side is placed on the working surface to slide so as to sense the movement state of the cursor, an included angle ranging from 50 degrees to 85 degrees is formed between a lowest point of the bottom contacted with the working surface or a plane where the lowest point is located and the working surface.

13. The mouse according to claim 1, wherein the outer side is provided with a foot pad which is configured to slide on the working surface when the outer side is placed on the working surface to slide so as to sense the movement state of the cursor.

14. The mouse according to claim 1, wherein a front end and a rear end of the outer side are respectively provided with a convex strip, and the convex strip is configured to slide on the working surface when the outer side is placed on the working surface to slide so as to sense the movement state of the cursor.

* * * * *